(12) United States Patent
Park et al.

(10) Patent No.: US 8,773,603 B2
(45) Date of Patent: Jul. 8, 2014

(54) LIQUID CRYSTAL DISPLAY WITH INTEGRATED TOUCH SCREEN PANEL

(75) Inventors: Jin-Woo Park, Yongin (KR); Hideo Yoshimura, Yongin (KR); Joo-Hyung Lee, Yongin (KR); Sang-Jin Pak, Yongin (KR); Cheol-Min Kim, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 21 days.

(21) Appl. No.: 13/137,957

(22) Filed: Sep. 22, 2011

(65) Prior Publication Data

US 2012/0113339 A1    May 10, 2012

(30) Foreign Application Priority Data

Nov. 4, 2010    (KR) .................. 10-2010-0109165

(51) Int. Cl.
*G02F 1/133*    (2006.01)
*G02F 1/1335*    (2006.01)

(52) U.S. Cl.
USPC ............. 349/33; 349/12; 345/173; 178/18.06

(58) Field of Classification Search
None
See application file for complete search history.

(56) References Cited

U.S. PATENT DOCUMENTS

| 5,684,505 | A | * | 11/1997 | Takita et al. | ................... | 345/104 |
| 2008/0309627 | A1 | * | 12/2008 | Hotelling et al. | ............. | 345/173 |
| 2010/0065341 | A1 |  | 3/2010 | Jeon | | |
| 2010/0265210 | A1 | * | 10/2010 | Nakanishi et al. | ............ | 345/174 |
| 2011/0050585 | A1 | * | 3/2011 | Hotelling et al. | ............. | 345/173 |
| 2013/0082977 | A1 | * | 4/2013 | Noguchi et al. | ............... | 345/174 |

FOREIGN PATENT DOCUMENTS

| KR | 10 2007-0081717 A | 8/2007 |
| KR | 10 2009-0019902 A | 2/2009 |
| KR | 10 2009-0050857 A | 5/2009 |

* cited by examiner

*Primary Examiner* — Bumsuk Won
*Assistant Examiner* — Ryan Crockett
(74) *Attorney, Agent, or Firm* — Lee & Morse, P.C.

(57) ABSTRACT

An LCD with an integrated touch screen panel includes a first substrate having a plurality of pixels formed thereon, wherein each pixel of the plurality of pixels is provided with a thin film transistor and a pixel electrode. A second substrate faces the first substrate and has a plurality of common electrodes formed inside thereof. The plurality of common electrodes is arranged in a first direction to correspond to the plurality of pixels. A plurality of sensing electrodes is outside of the second substrate and arranged in a second direction intersecting the first direction. A liquid crystal layer is between the first and the second substrates. A common electrode driver sequentially supplies a driving signal to the common electrodes and supplies a compensation signal having a phase opposite to the driving signal to the common electrodes.

13 Claims, 9 Drawing Sheets

LIQUID CRYSTAL DISPLAY WITH INTEGRATED TOUCH SCREEN PANEL

CROSS-REFERENCE TO RELATED APPLICATIONS

This application claims priority to and the benefit of Korean Patent Application No. 10-2010-0109165, filed on Nov. 4, 2010, in the Korean Intellectual Property Office, the entire content of which is incorporated herein by reference.

BACKGROUND

1. Field

Embodiments relate to a liquid crystal display (LCD). More particularly, embodiments relate to an LCD having a mutual capacitive touch screen panel integrated therein.

2. Description of the Related Art

A touch screen panel is an input device that allows a user's instruction to be input with a user's hand or object by selecting an instruction displayed on a screen of an image display.

The touch screen panel is formed on a front face of the image display to convert a contact position into an electrical signal. The user's hand or object is directly in contact with the touch screen panel at the contact position. Accordingly, the instruction selected at the contact position is input as an input signal to the image display.

Since a touch screen panel can be substituted for a separate input device connected to an image display, such as a keyboard or mouse, the applications utilizing touch screen panels have been increasing.

Touch screen panels are divided into a resistive overlay touch screen panel, a photosensitive touch screen panel, a capacitive touch screen panel, etc. Among these touch screen panels, the capacitive touch screen panel converts a contact position into an electrical signal by sensing a change in capacitance formed between a conductive sensing pattern and an adjacent sensing pattern, ground electrode, etc., when a user's hand or object is in contact with the touch screen panel.

A touch screen panel is generally attached to an outer surface of a flat panel display, i.e., a liquid crystal display or an organic light emitting display.

SUMMARY

Embodiments may be directed to a liquid crystal display (LCD) with an integrated touch screen panel, in which a common electrode provided to the LCD is used as a driving electrode of the mutual capacitive touch screen panel.

According to an embodiment, there is provided an LCD with an integrated touch screen panel, including: a first substrate having a plurality of pixels formed thereon, wherein each pixel of the plurality of pixels is provided with a thin film transistor and a pixel electrode; a second substrate facing the first substrate, the second substrate having a plurality of common electrodes formed inside thereof, wherein the plurality of common electrodes is arranged in a first direction to correspond to the plurality of pixels; a plurality of sensing electrodes outside of the second substrate and arranged in a second direction intersecting the first direction; a liquid crystal layer between the first and the second substrates; and a common electrode driver that sequentially supplies a driving signal to the common electrodes and supplies a compensation signal having a phase opposite to the driving signal to the common electrodes.

The common electrode driver may supply a common voltage to the common electrodes during a first frame period in which a predetermined image is displayed, and supply the driving signal and the compensation signal to the common electrodes during a second frame period in which touch recognition is performed.

The first and the second frame period may be alternately operated.

The compensation signal may be a voltage having a phase opposite to the driving signal and an amplitude identical to the driving signal.

The common electrode driver may supply the compensation signal to the common electrodes before or after supplying the driving signal to the common electrodes.

The common electrode driver may supply a common voltage between periods in which the driving signal and the compensation signal are supplied, respectively.

The common electrode driver may sequentially supply the driving and the compensation signals so that the driving and the compensation signals supplied to one common electrode of the plurality of common electrodes are not overlapped with those supplied to a previous common electrode of the plurality of common electrodes.

First electrodes of respective thin film transistors may be connected to data lines arranged on the first substrate, gate electrodes of the respective thin film transistors may be connected to gate lines arranged on the first substrate, and second electrodes of the respective thin film transistors may be connected to pixel electrodes.

The LCD may further include first and second polarizing plates attached to outer surfaces of the first and the second substrates, respectively; and a window attached to an outer surface of the second polarizing plate.

The sensing electrodes may be formed between the second substrate and the window.

The LCD may further include a back light below the first substrate to emit light.

The driving signal may be a voltage higher than the common voltage.

BRIEF DESCRIPTION OF THE DRAWINGS

The above subject matter will become more apparent to those of ordinary skill in the art by describing in detail exemplary embodiments with reference to the attached drawings, in which.

DETAILED DESCRIPTION

Figure 1:
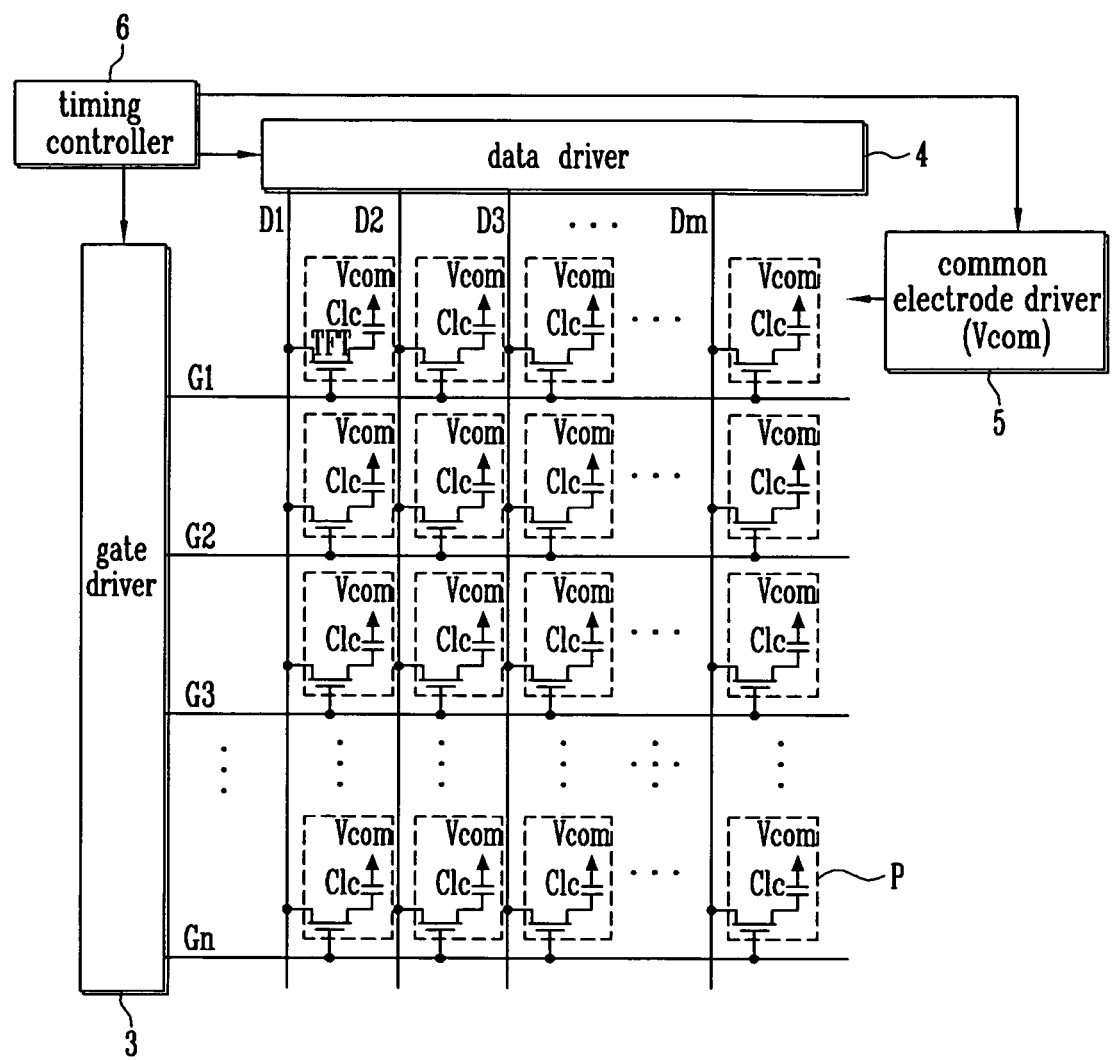
FIG. 1 illustrates a block diagram showing a liquid crystal display (LCD) with an integrated touch screen panel.

Example embodiments will now be described more fully hereinafter with reference to the accompanying drawings; however, they may be embodied in different forms and should not be construed as limited to the embodiments set forth herein In the following detailed description, only certain exemplary embodiments have been shown and described, simply by way of illustration. As those skilled in the art would realize, the described embodiments may be modified in various different ways, all without departing from the spirit or scope of present embodiments. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter exemplary embodiments will be described in detail with reference to the accompanying drawings.

Figure 2:
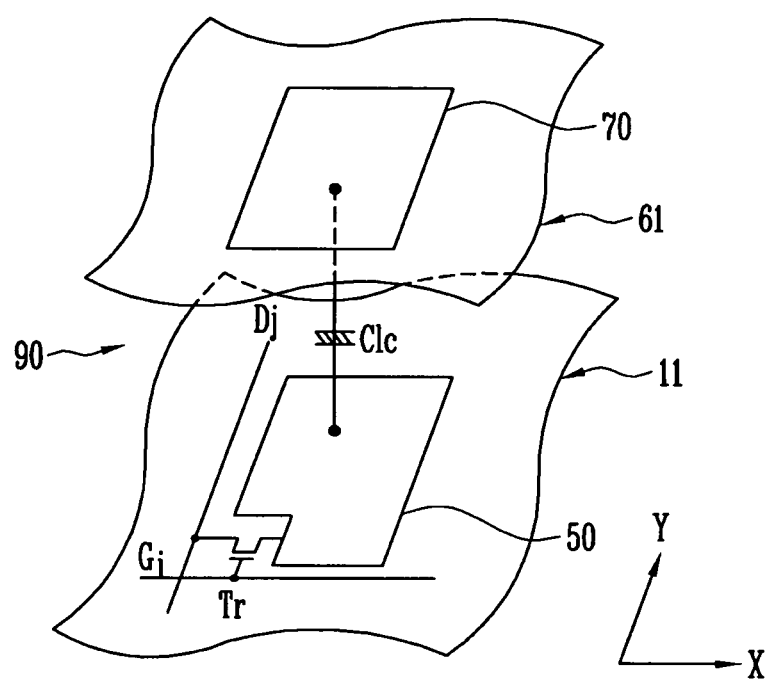
FIG. 2 illustrates an equivalent circuit diagram of a pixel shown in FIG. 1.
Figure 3:
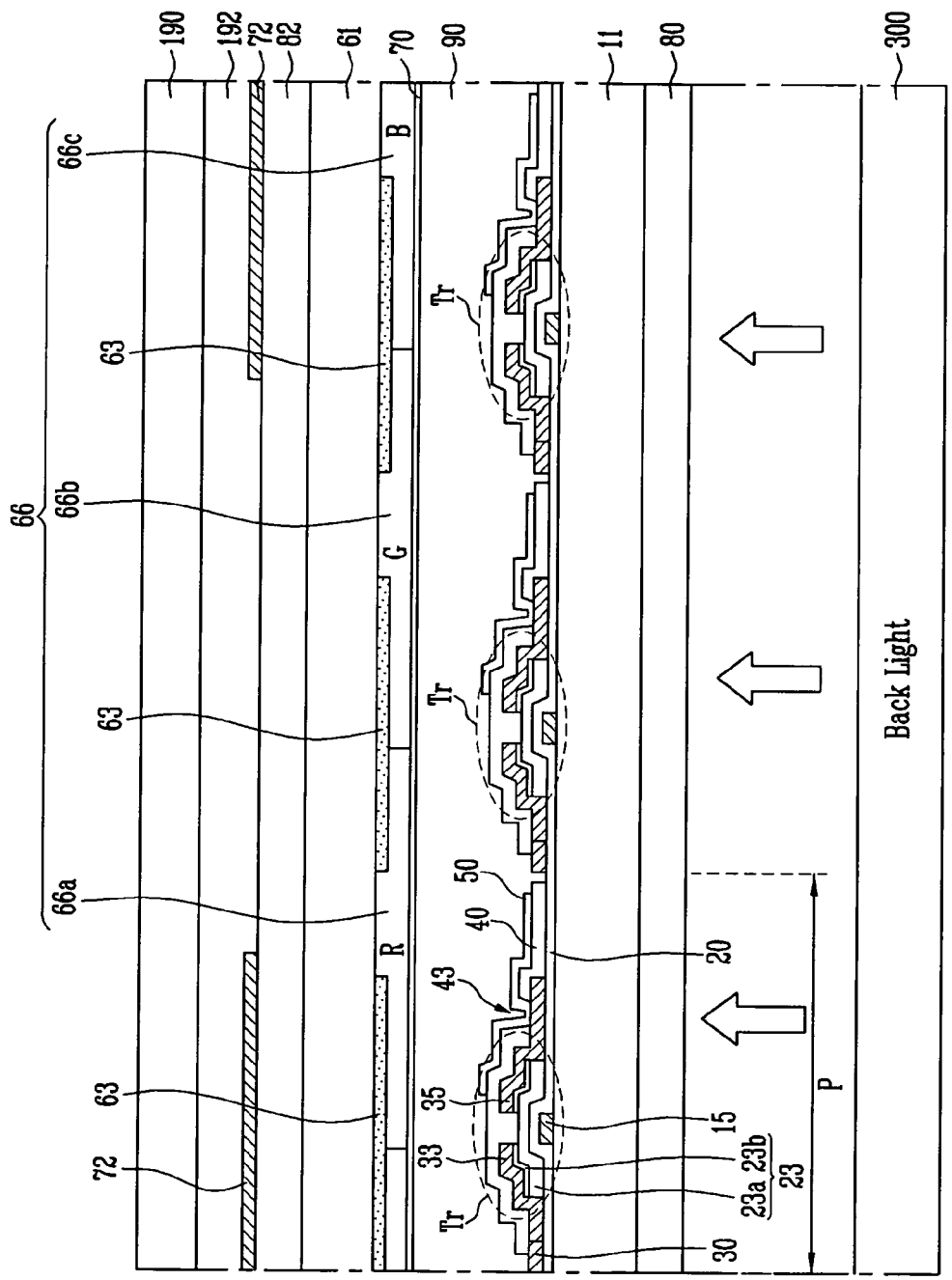
FIG. 3 illustrates a sectional view showing one area of the LCD with the integrated touch screen panel according to the embodiment.

FIG. 1 is a block diagram showing a liquid crystal display (LCD) with an integrated touch screen panel. The configuration of the LCD with the integrated touch screen panel for displaying images is illustrated in FIG. 1. FIG. 2 is an equivalent circuit diagram of a pixel shown in FIG. 1. FIG. 3 is a sectional view showing one area of the LCD with the integrated touch screen panel according to the embodiment.

As shown in FIG. 1, the LCD with the integrated touch screen panel according to this embodiment includes a gate driver 3 for supplying a gate signal to gate lines G1 to Gn arranged in a first direction (e.g., a horizontal direction), a data driver 4 for supplying a data signal to data lines D1 to Dm arranged in a second direction (e.g., a vertical direction) intersected with the first direction, a plurality of pixels P respectively having thin film transistors Tr connected to the gate lines G1 to Gn and the data lines D1 to Dm, and a common electrode driver 5 for supplying a common voltage and a driving signal to a common electrode 70. The LCD may further include a timing controller 6 for controlling the gate driver 3, the data driver 4 and the common electrode driver 6.

An LCD is a display that displays an image using the optical anisotropy and polarizing property of liquid crystals. The liquid crystals with a thin and long molecular structure have an optical anisotropy in which the molecular arrangement of the liquid crystals is directionally oriented and a polarizing property in which the molecular arrangement direction of the liquid crystals is changed in an electric field according to their sizes.

Accordingly, the LCD includes a liquid crystal panel as an essential component. The liquid crystal panel is configured by joining a first substrate and a second substrate respectively having pixel electrodes and a common electrode, formed on surfaces opposite to each other with a liquid crystal layer interposed therebetween. A predetermined electric field is formed by applying a data signal and a common voltage between the respective pixel and common electrodes of pixels selected by a gate signal, and the transmittance of light emitted from a back light is then controlled based on the arrangement angle of liquid crystals, changed by the electric field. Thus, an image is displayed.

Referring to the embodiment shown in FIGS. 2 and 3, the LCD with the integrated touch screen panel has a configuration in which a first substrate 11 and a second substrate 61 are joined together to face each other with a liquid crystal layer 90 interposed therebetween. The gate lines G1 to Gn and the data lines D1 to Dm horizontally and vertically intersected with each other are arranged on a top surface of the lower first substrate 11, and the thin film transistors Tr are provided at intersection points of the gate lines G1 to Gn and the data lines D1 to Dm so as to connected to pixel electrodes 50 formed in the pixels P one by one, respectively.

Referring to FIG. 2, the pixel P connected to an i-th gate line Gi and a j-th data line Dj includes a thin film transistor Tr connected to the i-th gate line Gi and the j-th data line Dj, a pixel electrode 50 connected to the thin film transistor Tr, and a liquid crystal capacitor Clc connected to the pixel electrode 50 and the common electrode 70.

As shown in FIG. 3, the thin film transistor Tr includes a gate electrode 15 connected to the gate line, source/drain electrodes 33 and 35, and a semiconductor layer 23 formed between the gate electrode 15 and the source/drain electrodes 33 and 35. The semiconductor layer 23 includes an active layer 23a and an ohmic contact layer 23b.

A gate insulating layer 20 is formed on the gate electrode 15, and a protection layer 40 is formed on the source/drain electrodes 33 and 35. A contact hole 43 is formed in the protection layer 40 so that the drain electrode 35 is exposed therethrough.

The pixel electrode 50 is formed on a top of the protection layer 40 to be connected to the drain electrode 35 through the contact hole 43.

The liquid crystal capacitor Clc uses the pixel electrode 50 and a common electrode 70 on the second substrate 61 as two terminals, and the liquid crystal layer 90 between the two electrodes 50 and 70 serves as a dielectric substance.

A lattice-shaped black matrix 63, red, green blue color filter patterns 66a, 66b and 66c and the common electrode 70 are formed on the rear surface of the upper second substrate 61 opposite to the first substrate 11. The lattice-shaped black matrix 63 surrounds each of the pixels P so as to cover a non-display area including the gate lines G1 to Gn, the data lines D1 to Dm, the thin film transistors Tr, etc. The red, green and blue color filter patterns 66a, 66b and 66c are sequentially and repeatedly arranged to correspond to the respective pixels P in the interior of the black matrix 63. The common electrode 70 is formed of a transparent conductive material below the color filter pattern 66.

An overcoat layer (not shown) may be further formed between the color filter pattern 66 and the common electrode 70. Since the positions of the black matrix 63 and the color filter pattern 66 may be changed, the common electrode 70 may be formed on an inner surface of the second substrate 61 when the positions of the black matrix 63 and the color filter pattern 66 are changed.

As shown in FIG. 3, first and second polarizing plates 80 and 82 are attached to outer surfaces of the first and second substrates 11 and 61, respectively. A window 190 as a transparent substrate is attached on the polarizing plate in a direction in which an image is displayed.

The embodiment shown in FIG. 3 has a structure in which a back light 300 is positioned below the first substrate 11.

Thus, an image is displayed in the direction of the second substrate 61. The window 190 is attached on the second polarizing plate 82. In the embodiment shown in FIG. 3, the first polarizing plate 80 is provided, and hence the back light 300 is positioned below the first polarizing plate 80.

The image display operation of the LCD with the integrated touch screen panel having the configuration as described above will be briefly described as follows.

If a gate signal is applied to the gate electrode 15 of the thin film transistor Tr provided to each of the pixels P, the active layer 23*a* is activated. Accordingly, the source electrode 33 transfers a data signal applied from a data line 30 connected to the source electrode 33 to the drain electrode 35 spaced apart from the source electrode 33 at a predetermined interval via the active layer 23*a* positioned below the source electrode 33.

The drain electrode 35 is electrically connected to the pixel electrode 50 through the contact hole 43. Therefore, the voltage of the data signal is applied to the pixel electrode 50, and the applied voltage is stored in a storage capacitor Cst provided to each of the pixels P.

The arrangement of liquid crystal molecules between the pixel electrode 50 and the common electrode 70 is controlled according to a voltage corresponding to the difference between voltages respectively applied to the pixel electrode 50 and the common electrode 70. Thus, a predetermined image may be displayed.

In the LCD of the related art, the common electrode 70 is integrally formed on the entire lower surface of the second substrate 61 to receive the same voltage.

On the other hand, in the LCD with the integrated touch screen panel according to this embodiment, the common electrode 70 is formed as a plurality of patterns separated from one another, so that the patterns are used as driving electrodes of a mutual capacitive touch screen panel.

For example, the common electrode 70 is implemented as a plurality of patterns 70*a* arranged to be spaced apart at a predetermined interval in a first direction (e.g., an X-axis direction) (see FIG. 4), and the plurality of patterns 70 are used as driving electrodes of the touch screen panel. The sensing electrodes 72 of the touch screen panel are formed at the outside of the second substrate 61.

In a case where the second polarizing plate 82 and the window 190 are provided, the sensing electrodes 72 may be formed between the second substrate 61 and the window 190. The sensing electrodes 72 may be formed on the top surface of the second polarizing plate 82 as shown in FIG. 3, or may be formed on the bottom surface of the window 190. Alternatively, the sensing electrodes 72 may be formed on the top surface of the second substrate 61 or on the bottom surface of the second polarizing plate 82.

The sensing electrodes 72 are implemented as a plurality of patterns arranged to be spaced apart at a predetermined interval in a second direction (e.g., a Y-axis direction) intersected with the first direction.

The sensing electrodes 72 are formed of a transparent conductive material (e.g., indium tin oxide (ITO)), and may be implemented by attaching a film having the transparent conductive material patterned thereon to the second polarizing plate 82, the window 90, etc.

Hereinafter, the electrode structure and operation of the LCD with the integrated touch screen panel according to this embodiment will be described in detail with reference to FIGS. 4 to 6.

Figure 4:
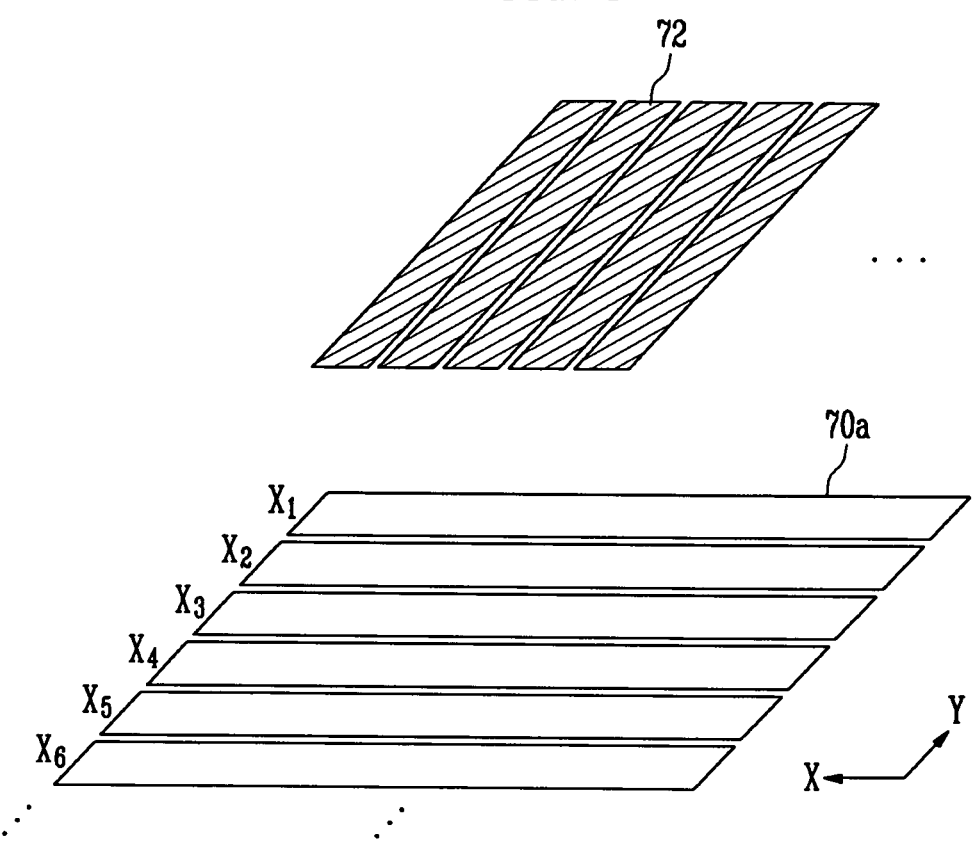
FIG. 4 illustrates a perspective view showing the structure of common electrode patterns (driving electrodes) and sensing electrodes shown in FIG. 3.
Figure 5:
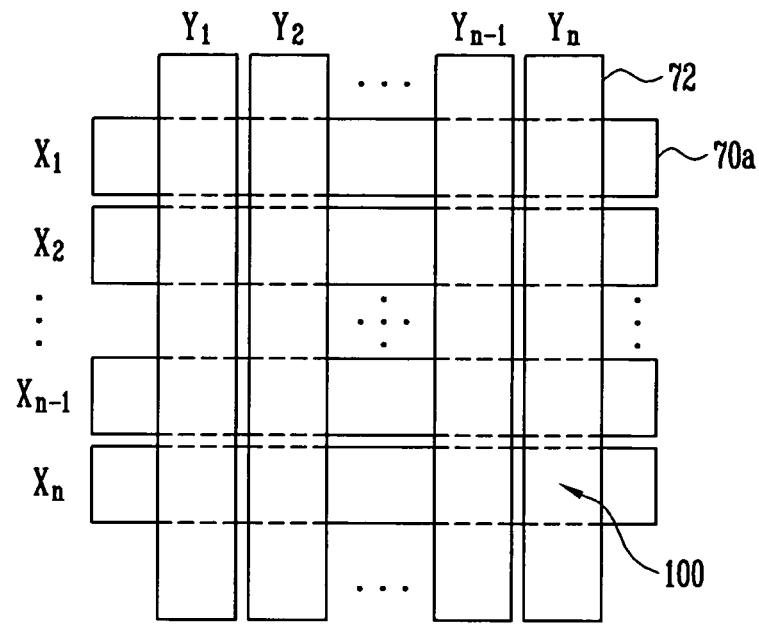
FIG. 5 illustrates a top view showing the structure of the common electrode patterns (driving electrodes) and sensing electrodes shown in FIG. 3.

FIG. 4 is a perspective view showing the structure of common electrode patterns (driving electrodes) and sensing electrodes shown in FIG. 3. FIG. 5 is a top view showing the structure of the common electrode patterns (driving electrodes) and sensing electrodes shown in FIG. 3.

Referring to FIG. 4, the common electrode 70 is implemented as X1 to Xn patterns 70*a* arranged to be spaced apart at a predetermined interval in the first direction (e.g., the X-axis direction), and the X1 to Xn patterns 70*a* are used as driving electrodes of the touch screen panel. As described above, the sensing electrodes 72 corresponding to the driving electrodes 70*a* are implemented by forming Y1 to Yn patterns arranged to be spaced apart at a predetermined interval in the second direction (e.g., the Y-direction) intersected with the first direction at the outside of the second substrate 61.

Through the arrangement of the driving electrodes 70*a* and the sensing electrodes 72, mutual capacitances between the driving electrodes 70*a* and the sensing electrodes 72 are formed at intersection points of the driving electrodes 70*a* and the sensing electrodes 72, respectively. The intersection points at which the mutual capacitances are formed become sensing cells 100 for implementing touch recognition.

Figure 6:
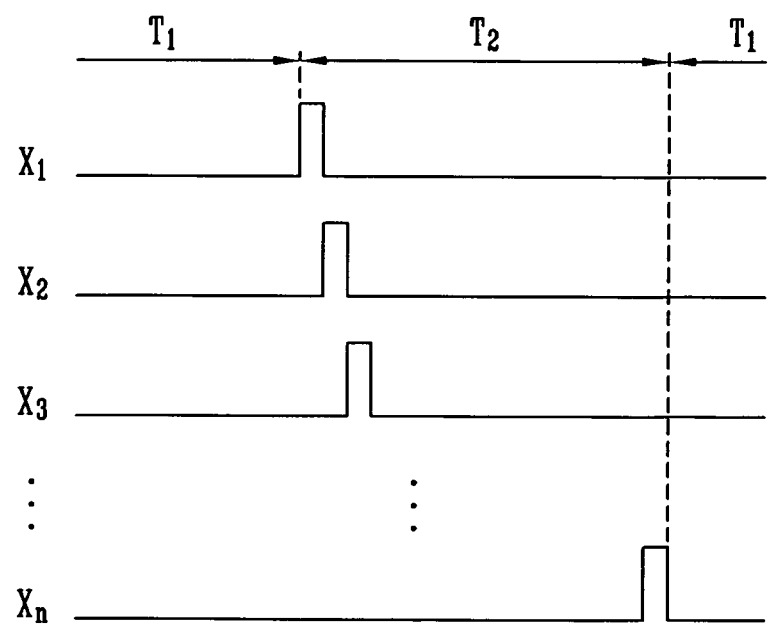
FIG. 6 illustrates a waveform diagram showing signals generally supplied to common electrodes.

FIG. 6 is a waveform diagram showing signals generally supplied to common electrodes. The signals shown in FIG. 6 may be supplied to the common electrodes 70 so as to display an image and to sense a touch contacted from the exterior in the LCD with the integrated touch screen panel according to this embodiment.

Referring to FIG. 6, the voltage of the common electrodes 70 is necessarily maintained constant during a period in which a gate signal is sequentially supplied to the gate lines G1 to Gn so as to display an image, i.e., during a first frame period T1 in which a predetermined image is displayed. Therefore, a common voltage having the same amplitude is supplied to each of the common electrodes 70.

Subsequently, a driving signal having a high-level voltage is sequentially supplied to each of the common electrodes 70 during a second frame period T2. The driving signal is used to determine a touch position, and may be a higher voltage than the common voltage.

In a case where a sensing cell 100 having the driving signal supplied thereto is touched by a finger, etc., voltage is generated by a change in mutual capacitance, thereby sensing a touch position. In a case where the finger is positioned at the sensing cell 100 in which the X1 driving electrode and the Y1 sensing electrode are overlapped with each other will be described as an example. If a driving signal is supplied to the X1 driving electrode, the mutual capacitance is changed by the finger, and a specific voltage generated by the change in mutual capacitance is detected in the Y1 sensing electrode, so that the intersection point between the X1 driving electrode and the Y1 sensing electrode is specified as a touch position.

If the driving signal is supplied to each of the common electrodes 70 in the manner described in FIG. 6 so as to recognition of the touch position, the voltage of the common electrode 70 is rapidly changed. Accordingly, the pixel voltage applied to the liquid crystal capacitor Clc is also changed, thereby resulting in abnormality of image quality (flicker phenomenon, occurrence of horizontal stripe, or the like). In order to better sense a touch, the amplitude of the voltage of the driving signal applied to the common electrode 70 may be increased, and the number of times at which the driving signal is supplied may be increased. However, this has an influence on the pixel voltage, and the image quality may deteriorate.

In order to solve this problem, the common electrode driver 5 in the LCD with an integrated touch panel sequentially supplies a driving signal to the common electrodes 70, and simultaneously supplies a compensation signal having a phase opposite to the supplied driving signal. The compensation signal may be a voltage having a phase opposite to the driving signal and an amplitude identical to the driving signal.

Figure 7:
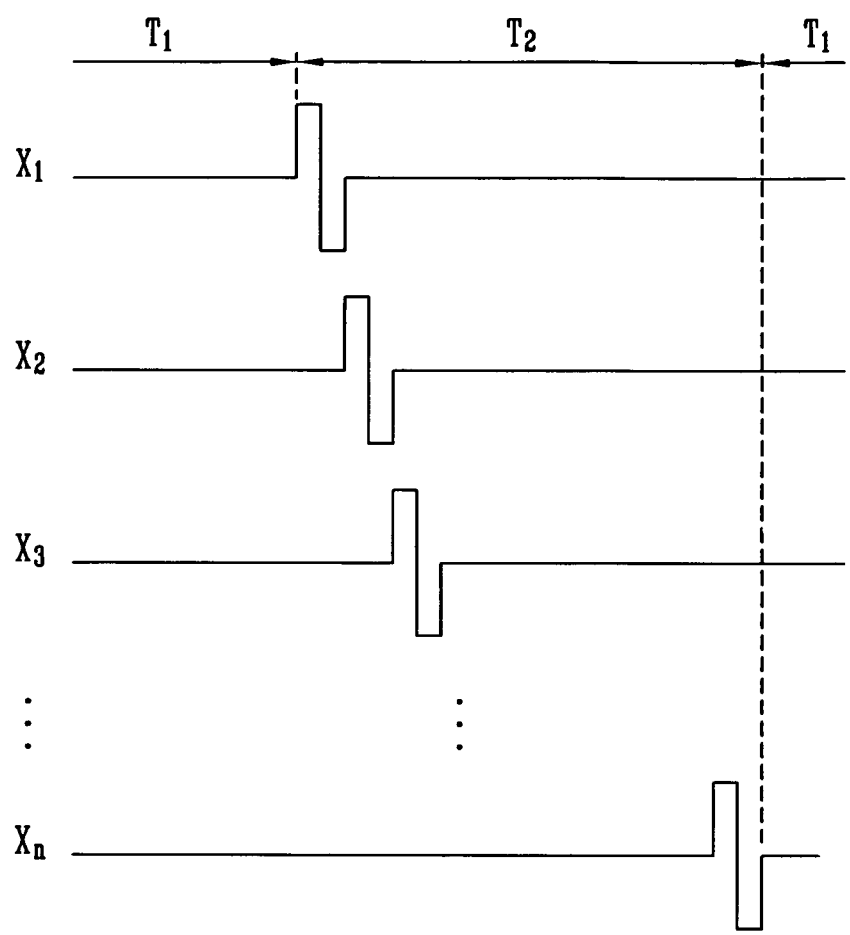
FIG. 7 illustrates a waveform diagram showing signals supplied to common electrodes by a common electrode driver according to an embodiment.

FIG. 7 is a waveform diagram showing signals supplied to common electrodes by a common electrode driver according to an embodiment.

Referring to FIG. 7, a common voltage having the same amplitude is supplied to each of the common electrodes 70 during a first frame period T1 in which a predetermined image is displayed. During a second frame period T2 in which touch recognition is performed, a driving signal is supplied to each of the common electrodes 70, and a compensation signal having a phase opposite to the driving signal is consecutively supplied to each of the common electrodes 70.

An abnormal change in pixel voltage generated as the driving signal is supplied to each of the common electrodes 70 is offset by the compensation signal, so that the problem of image quality does not occur.

This embodiment may be modified as the following embodiments to be described with reference to FIGS. 8 to 10.

Figure 8:
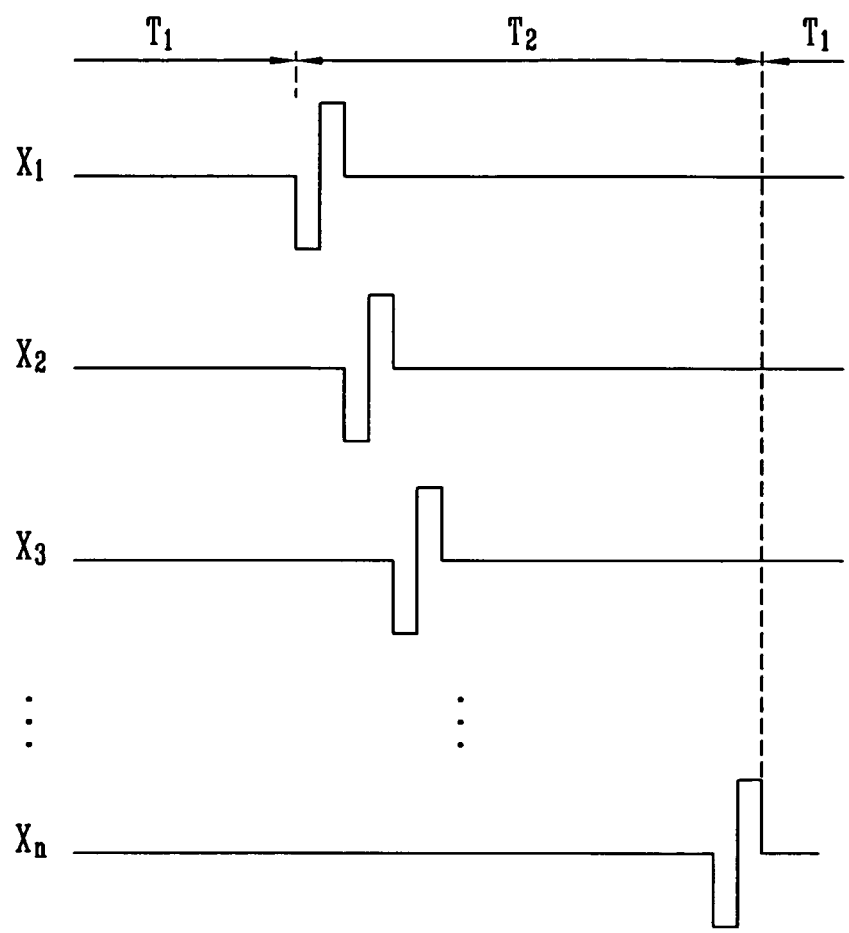
FIG. 8 illustrates a waveform diagram showing signals supplied to the common electrodes by the common electrode driver according to another embodiment.

FIG. 8 is a waveform diagram showing signals supplied to the common electrodes by the common electrode driver according to another embodiment.

Referring to FIG. 8, a common voltage having the same amplitude is supplied to each of the common electrodes 70 during a first frame period T1 in which a predetermined image is displayed. However, during a second frame period T2 in which touch recognition is performed, a driving signal and a compensation signal having a phase opposite to the driving signal are first supplied. The driving signal is then supplied just after the compensation signal is supplied.

Figure 9:
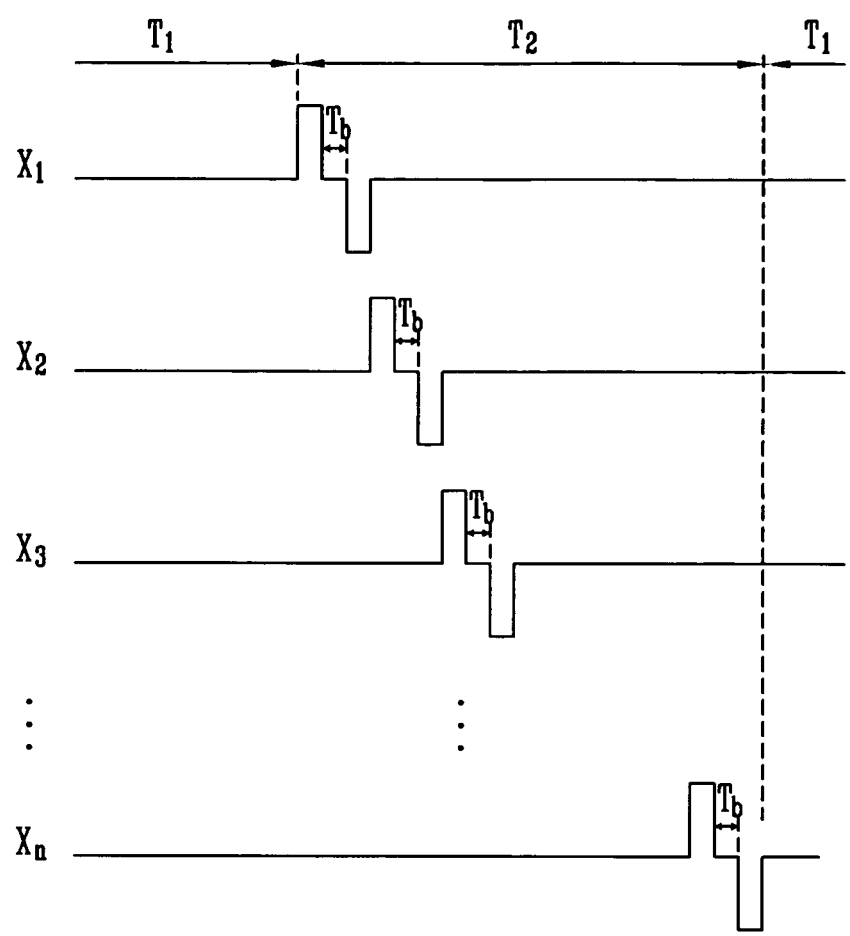
FIG. 9 illustrates a waveform diagram showing signals supplied to the common electrodes by the common electrode driver according to still another embodiment.

FIG. 9 is a waveform diagram showing signals supplied to the common electrodes by the common electrode driver according to still another embodiment. The embodiment shown in FIG. 9 is similar to that shown in FIG. 7, but the common voltage is supplied during a predetermined period Tb between the periods in which the driving signal and the compensation signal are supplied, respectively.

Figure 10:
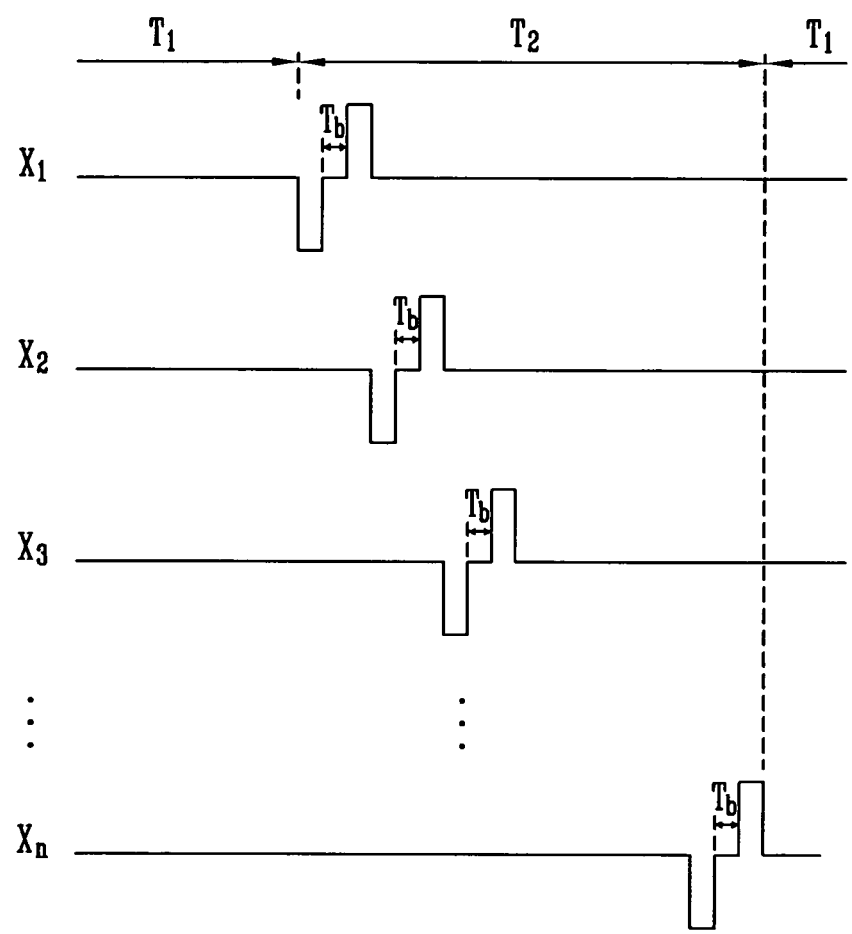
FIG. 10 illustrates a waveform diagram showing signals supplied to the common electrodes by the common electrode driver according to still another embodiment.

FIG. 10 is a waveform diagram showing signals supplied to the common electrodes by the common electrode driver according to still another embodiment. The embodiment shown in FIG. 10 is similar to that shown in FIG. 8, but the common voltage is supplied during a predetermined period Tb between the periods in which the driving signal and the compensation signal are supplied, respectively.

The compensation signal may be supplied after the driving signal is supplied as shown in the embodiments described with reference to FIGS. 7 and 9, or the driving signal may be supplied after the compensation signal is supplied as shown in the embodiments described with reference to FIGS. 8 and 10.

The driving signal and the compensation signal may be consecutively supplied as shown in the embodiments described with reference to FIGS. 7 and 8, or the predetermined period Tb in which the common voltage is supplied may exist between the periods in which the driving signal and the compensation signal are supplied, respectively, as shown in the embodiments described with reference to FIGS. 9 and 10.

In the aforementioned embodiments, the driving signal and the compensation signal are sequentially supplied to each of the common electrode 70. In this instance, the driving and compensation signals supplied to a current common electrode Xi (i is a natural number) may be supplied not to be overlapped with the driving and compensation signals supplied to the previous common electrode Xi-1. The first frame period T1 and the second frame period T2 may be alternatively operated.

By way of summation and review, heretofore, where a touch screen panel is attached to an outer face of a flat panel display, it may be necessary to provide an adhesive layer between the touch screen panel and the flat panel display. In addition, it may be necessary to separately perform a forming process of the touch screen panel. Thus, processing time and cost are increased.

Furthermore, the touch screen panel is attached to an outer surface of the flat panel display. Thus, the entire thickness of the flat panel display is increased.

Present embodiments advance the art by providing an LCD with an integrated touch screen panel which may remove the degradation of image quality caused by supplying a driving signal to a common electrode. Thus, touch recognition may be performed.

According to present embodiments, common electrodes provided to an LCD can be used as driving electrodes of a mutual capacitive touch screen panel. The degradation of image quality can be circumvented by supplying a driving signal to each of the common electrode so as to perform touch recognition.

Exemplary embodiments have been disclosed herein, and although specific terms are employed, they are used and are to be interpreted in a generic and descriptive sense only and not for purpose of limitation.

What is claimed is:

1. A liquid crystal display (LCD) with an integrated touch screen panel, comprising:
    a first substrate having a plurality of pixels formed thereon, wherein each pixel of the plurality of pixels is provided with a thin film transistor and a pixel electrode;
    a second substrate facing the first substrate, the second substrate having a plurality of spaced common electrodes formed inside thereof, wherein the plurality of common electrodes is arranged in a first direction to correspond to the plurality of pixels and are not connected to one another;
    a plurality of sensing electrodes outside of the second substrate and arranged in a second direction intersecting the first direction;
    a liquid crystal layer between the first and the second substrates; and
    a common electrode driver that sequentially supplies a driving signal to the common electrodes and supplies a compensation signal having a phase opposite to the driving signal to the common electrodes, wherein:
    each common electrode is coupled to a different row of pixels, and
    the common electrode driver sequentially supplies driving signals to the common electrodes in a frame period, the common electrode driver supplying a driving signal with a compensation signal to each common electrode only once within the frame period.

2. The LCD as claimed in claim 1, wherein the common electrode driver supplies a common voltage to the common electrodes during a first frame period in which a predetermined image is displayed, and supplies the driving signal and the compensation signal to the common electrodes during a second frame period in which touch recognition is performed.

3. The LCD as claimed in claim 2, wherein the first and the second frame period are alternately operated.

4. The LCD as claimed in claim 1, wherein the compensation signal is a voltage having a phase opposite to the driving signal and an amplitude identical to the driving signal.

5. The LCD as claimed in claim 1, wherein the common electrode driver supplies the compensation signal to the common electrodes before or after supplying the driving signal to the common electrodes.

6. The LCD as claimed in claim 1, wherein the common electrode driver supplies a common voltage between periods in which the driving signal and the compensation signal are supplied, respectively.

7. The LCD as claimed in claim 1, wherein first electrodes of respective thin film transistors are connected to data lines arranged on the first substrate, gate electrodes of the respective thin film transistors are connected to gate lines arranged on the first substrate, and second electrodes of the respective thin film transistors are connected to pixel electrodes.

8. The LCD as claimed in claim 1, further comprising:

first and second polarizing plates attached to outer surfaces of the first and the second substrates, respectively; and a window attached to an outer surface of the second polarizing plate.

9. The LCD as claimed in claim 8, wherein the sensing electrodes are formed between the second substrate and the window.

10. The LCD as claimed in claim 1, further comprising a back light below the first substrate to emit light.

11. The LCD as claimed in claim 2, wherein
the driving signal is a voltage higher than the common voltage.

12. The LCD as claimed in claim 1, wherein the common electrode driver supplies the driving signal to one common electrode during a first period and supplies a compensation signal to another common electrode during a second period which overlaps the first period.

13. The LCD as claimed in claim 1, wherein:

at least one common electrode is disposed in opposing relation to a pixel electrode of at least one of the plurality of pixels to form a capacitor wherein light emitted from the at least one of the plurality of pixels is based on a voltage stored in the capacitor formed between the at least one common electrode and the pixel electrode.

* * * * *